United States Patent
Mikkelson et al.

(10) Patent No.: US 12,348,495 B2
(45) Date of Patent: Jul. 1, 2025

(54) TRANSPORT LAYER PROTOCOL STATE HANDLING FOR BORDER GATEWAY PROTOCOL (BGP) PROCESSES

(71) Applicant: Arista Networks, Inc., Santa Clara, CA (US)

(72) Inventors: Joanne Mikkelson, Milpitas, CA (US); Sharad Birmiwal, Burnaby (CA); Salam Noureddine, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 136 days.

(21) Appl. No.: 18/168,062

(22) Filed: Feb. 13, 2023

(65) Prior Publication Data

US 2024/0275765 A1    Aug. 15, 2024

(51) Int. Cl.
*H04L 29/06* (2006.01)
*H04L 9/40* (2022.01)

(52) U.S. Cl.
CPC ........ *H04L 63/029* (2013.01); *H04L 63/0236* (2013.01); *H04L 63/166* (2013.01)

(58) Field of Classification Search
None
See application file for complete search history.

(56) References Cited

U.S. PATENT DOCUMENTS

| | | |
|---|---|---|
| 7,230,914 B2 | 6/2007 | Sankar et al. |
| 7,286,468 B2 | 10/2007 | Scudder et al. |
| 7,417,947 B1 | 8/2008 | Marques et al. |
| 7,506,194 B2 | 3/2009 | Appanna et al. |
| 7,609,617 B2 | 10/2009 | Appanna et al. |
| 7,751,311 B2 | 7/2010 | Ramaiah et al. |
| 7,787,365 B1 | 8/2010 | Marques et al. |
| 7,801,135 B2 | 9/2010 | Appanna et al. |
| 7,940,650 B1 | 5/2011 | Sandhir et al. |
| 8,005,980 B2 | 8/2011 | Harvey et al. |
| 8,254,396 B2 | 8/2012 | Appanna et al. |
| 8,537,660 B2 | 9/2013 | Ramaiah et al. |

(Continued)

FOREIGN PATENT DOCUMENTS

| | | | |
|---|---|---|---|
| EP | 1938115 B1 * | 8/2013 | ............. H04L 45/04 |
| EP | 2680515 B1 | 3/2017 | |

OTHER PUBLICATIONS

Mankin et al., The TCP Authentication Option; Internet Engineering Task Force, ISSN: 2070-1721, Jun. 2010 (Year: 2010).*

*Primary Examiner* — Andrew J Steinle
(74) *Attorney, Agent, or Firm* — Treyz Law Group, P.C.; Tianyi He

(57) ABSTRACT

A networking system may perform a border gateway protocol (BGP) switchover from an active BGP process to a standby BGP process. The standby BGP process may obtain transport layer protocol state information, for a given time, of a transport layer session for the active BGP process. The standby BGP process may update the transport layer protocol state information based on BGP messages conveyed, after the given time, over the transport layer session and forwarded to the standby BGP process. Based on a BGP switchover criterion being met, a replacement transport layer session may be set up using the updated transport layer protocol state information. The replacement transport layer session continues the transport layer session after the BGP switchover.

20 Claims, 9 Drawing Sheets

(56) References Cited

U.S. PATENT DOCUMENTS

| | | |
|---|---|---|
| 8,769,155 B2 | 7/2014 | Nagappan et al. |
| 9,106,525 B2 | 8/2015 | Ramaiah et al. |
| 9,166,904 B2 | 10/2015 | Appanna |
| 9,356,859 B2 | 5/2016 | Hanif et al. |
| 9,491,107 B1 | 11/2016 | Scudder et al. |
| 2006/0062142 A1* | 3/2006 | Appanna ............... H04L 69/40 370/242 |
| 2010/0265956 A1 | 10/2010 | Li |
| 2012/0140616 A1 | 6/2012 | Zhou et al. |

* cited by examiner

TRANSPORT LAYER PROTOCOL STATE HANDLING FOR BORDER GATEWAY PROTOCOL (BGP) PROCESSES

BACKGROUND

A communication system includes multiple network devices that are interconnected to form a network for conveying packets from source devices to destination devices. Routing information indicating how (e.g., the routes based on which) the packets are to be conveyed to destination devices are shared amongst one or more sets of peer network devices using Border Gateway Protocol (BGP) established over corresponding Transmission Control Protocol (TCP) sessions between pairs of peer network devices. Each of these peer network devices performs a BGP process to maintain routing information for different purposes (e.g., a local routing information base, one or more incoming routing information bases, one or more outgoing routing information bases, etc.) but ultimately to the aim of receiving, processing, and conveying routing information such as network layer reachability information (NLRI) and path attributes, thereby facilitating the use of BGP amongst its peer network devices.

DETAILED DESCRIPTION

Figure 1:
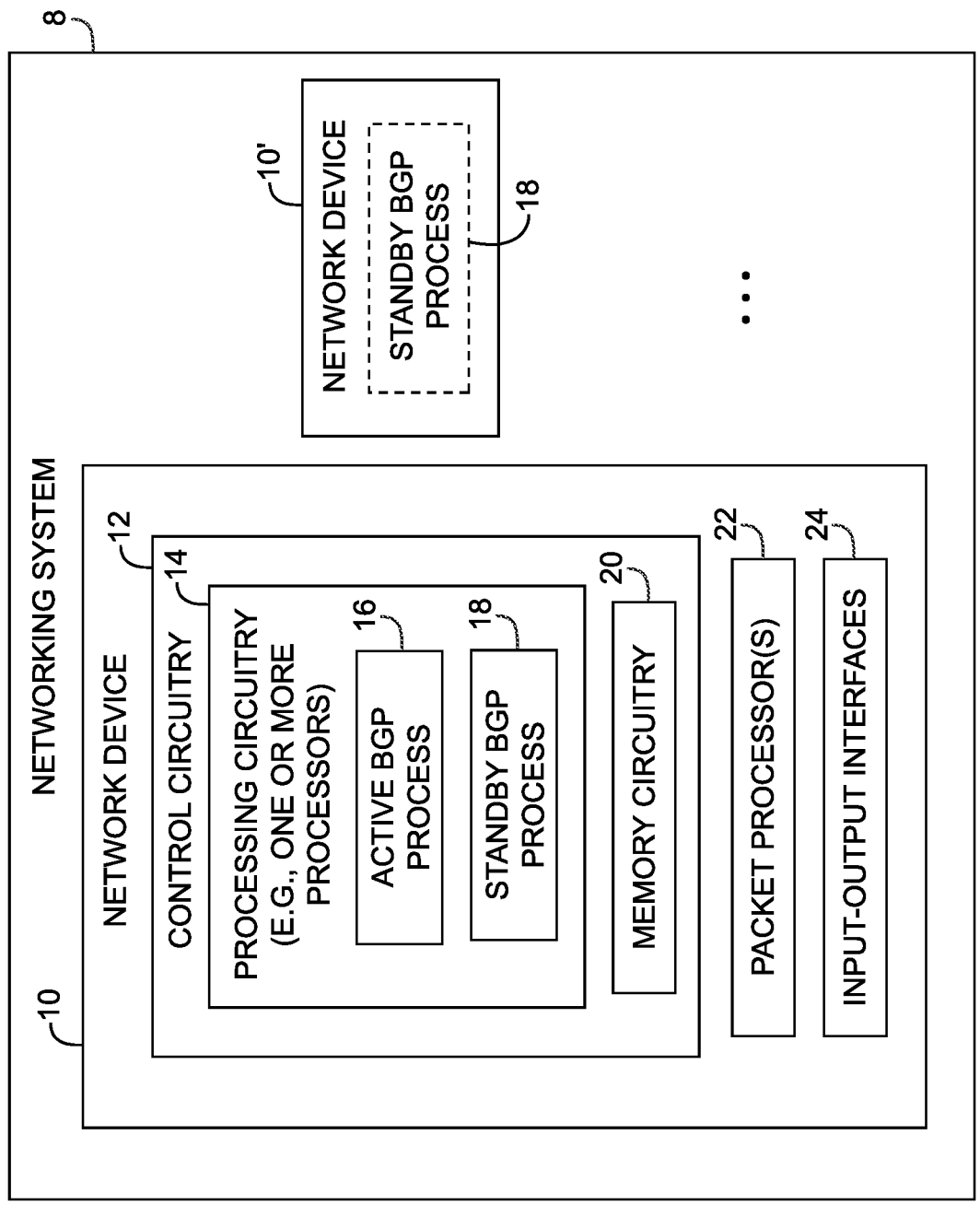
FIG. 1 is a diagram of an illustrative networking system configured to execute an active Border Gateway Protocol (BGP) process and a standby BGP process in accordance with some embodiments.

Network devices such as routers (e.g., multi-layer L2/L3 switches) may use Border Gateway Protocol (BGP) to exchange routing information. As an example, a particular network device may exchange the routing information through BGP with one or more BGP peer network devices over corresponding Transmission Control Protocol (TCP) sessions, or if desired, using other reliable transport layer (L4) protocols. Each of these network devices may execute a BGP process (sometimes referred to herein as a BGP agent) that facilitates the reception of routing information in BGP messages from one or more BGP peer network devices, the processing of (e.g., route selection based on) the received routing information, and the transmission of routing information in BGP messages to one or more peer network devices, as three illustrative operations among numerous other operations performed by the BGP process.

However, a network device, or more specifically, the BGP process executing on the network device can experience failure events which can lead to a disruption in the exchange of routing information and the network device's role as a BGP peer network device (sometimes referred to as a BGP speaker) to its BGP peer network devices. It may therefore be desirable to provide BGP failover functionalities such that the network device can resolve such failure events and to do so in a manner transparent to its BGP peer network devices (e.g., such that the peer network devices are unaware that the network device and/or the BGP process thereon are experiencing the failure event) to avoid the above-mentioned disruption. Accordingly, a networking system may execute a standby BGP process with which the active BGP process on the network device can perform a switchover operation in response to a failure event affecting the active BGP process.

Because BGP sessions between respective BGP peer network devices are established over corresponding TCP sessions or sessions based on other transport layer protocols, preserving these L4 protocol sessions during the BGP process switchover can be an integral part of providing the above-mentioned transparency to BGP peer network devices. As described herein, BGP sessions can generally be established over any suitable (e.g., reliable) transport layer protocol sessions. Configurations in which BGP sessions are established using TCP are sometimes described herein as illustrative examples. If desired, these BGP sessions may be established using other transport layer protocols.

More specifically, to ensure a seamless transition during BGP switchover, the standby BGP process may be configured to provide, after the BGP switchover, one or more transport layer sessions that serve as continuations of the one or more corresponding transport layer sessions previously provided by the active BGP process (prior to the failure event). Accordingly, prior to and in preparation for BGP switchover, the active BGP process may share initial transport layer protocol state information (e.g., a snapshot of parameters and buffer content for enabling each transport layer protocol session) with the standby BGP process. The standby BGP process may update the shared initial transport layer protocol state information (e.g., the protocol parameters and buffer content) during its operation prior to BGP switchover. For BGP switchover, the standby BGP process may use its updated (e.g., up-to-date) transport layer protocol state information to continue transport layer sessions where the active BGP process left off, thereby preserving these existing transport layer sessions (instead of restarting new transport layer sessions which would undesirably alert BGP peer devices to the BGP process failure event). An illustrative networking system configured to provide BGP (process) switchover functionalities that seamlessly preserve existing transport layer sessions is shown in FIG. 1.

FIG. 1 is a diagram of an illustrative networking system 8 that includes one or more network devices. Each of the network devices in system 8 may be a switch (e.g., a multi-layer L2/L3 switch), a router or gateway, a bridge, a hub, a repeater, a firewall, a wireless access point, a device serving other networking functions, a device that includes a combination of these functions, or other types of network devices. Multiple such network devices (e.g., of different types or having different functions) in networking system 8 may be present and interconnected therebetween and with other network devices in other network portions to form a communications network that forwards traffic (e.g., packets) between end hosts.

The communications network may be implemented with any suitable scope (e.g., as a wide area network, including one or more campus area networks, including one or more local area networks, etc.). If desired, the communications network may include internet service provider networks (e.g., the Internet) or other public service provider networks, private service provider networks (e.g., multiprotocol label switching (MPLS) networks), and/or may include other types of networks such as telecommunication service provider networks (e.g., a long-term evolution (LTE) network).

An illustrative network device of networking system 8 is network device 10. Configurations in which network device 10 includes a router, a switch having L3 (layer 3 or network layer) processing functionalities (e.g., a multi-layer switch), or any other device with network routing functionalities are sometimes described herein as illustrative examples.

As shown in FIG. 1, network device 10 may include control circuitry 12 having processing circuitry 14 and memory circuitry 20, one or more packet processors 22, and input-output interfaces 24 disposed within a housing of network device 10. The housing may include an exterior cover (e.g., a plastic exterior shell, a metal exterior shell, or an exterior shell formed from other rigid or semi-rigid materials) that provides structural support and protection for the components of network device 10 mounted within the housing. In one illustrative arrangement, network device 10 may be or form part of a modular network device system (e.g., a modular switch system having removably coupled modules usable to flexibly expand the capabilities such as ports, specialized functionalities, etc., of the modular switch system). If desired, the modular system containing network device 10 may also contain other network devices such as network device 10', network devices on line cards, etc. In another illustrative arrangement, network device 10 may be a fixed-configuration network device (e.g., a fixed-configuration switch having a fixed number of ports and/or a fixed hardware configuration).

Processing circuitry 14 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 14 may run (e.g., execute) a network device operating system and/or other software/firmware that is stored on memory circuitry 20. Memory circuitry 20 may include non-transitory (tangible) computer readable storage media that stores the operating system software and/or any other software code, sometimes referred to as program instructions, software, data, instructions, or code. As an example, the operations described herein for facilitating the BGP switchover as well as other network device control plane functions may be stored as (software) instructions on the non-transitory computer-readable storage media (e.g., in portion(s) of memory circuitry 20 in network device 10).

The corresponding processing circuitry (e.g., one or more processors of processing circuitry 14 in network device 10) may process or execute the respective instructions to perform the corresponding operations (e.g., for facilitating the BGP switchover). Memory circuitry 20 may be implemented using non-volatile memory (e.g., flash memory or other electrically-programmable read-only memory configured to form a solid-state drive), volatile memory (e.g., static or dynamic random-access memory), hard disk drive storage, and/or other storage circuitry. Processing circuitry 14 and memory circuitry 20 as described above may sometimes be referred to collectively as control circuitry 12 (e.g., implementing a control plane of network device 10).

In particular, processing circuitry 14 may execute network device control plane software such as operating system software, routing policy management software, routing protocol agents or processes (e.g., one or more BGP processes such as active BGP process 16 and optionally standby BGP process 18), routing information base agents, and other control software, may be used to support the operation of protocol clients and/or servers (e.g., to form some or all of a communications protocol stack such as the TCP/IP stack), may be used to support the operation of packet processor(s) 22, may store packet forwarding information, may execute packet processing software, and/or may execute other software instructions that control the functions of network device 10 and the other components therein. While processing circuitry 14 is primarily described herein as executing one or more BGP processes, processing circuitry 14 may also execute one or more other network routing protocol agents or processes. As examples, these other network protocol agents may implement non-BGP distance vector routing protocols, Exterior Gateway Protocol (EGP), Interior Gateway Protocols (IGP) such as Enhanced Interior Gateway Routing Protocol (EIGRP), intermediate system-to-intermediate system (IS-IS) protocol, Routing Information Protocol (RIP), or Open Shortest Path First (OSPF) protocol, Label Distribution Protocol (LDP), Multiprotocol Label Switching (MPLS), or other (Internet) routing protocols (just to name a few).

Packet processor(s) 22 may be used to implement a data plane or forwarding plane of network device 10. Packet processor(s) 22 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 22 may receive incoming data packets via input-output interfaces 24 (e.g., ports), parse and analyze the received data packets, process the packets based on packet forwarding decision data (e.g., in a forwarding information base) and/or in accordance with network protocol(s) or other forwarding policy, and forward (or drop) the data packet accordingly. The packet forwarding decision data may be stored on a portion of memory circuitry 20 and/or other memory circuitry integrated as part of or separate from packet processor 22.

Input-output interfaces 24 may include communication interface components such as an Ethernet interface (e.g., one or more Ethernet ports), an optical interface, a BLUETOOTH® interface, a WI-FI® interface, and/or other networking interfaces for connecting network device 10 to the Internet, a local area network, a wide area network, a mobile network, other portions of the communications network, and/or to other network device(s), peripheral devices, and/or other computing equipment (e.g., host equipment, user equipment, etc.). Network device 10 may also include other components such as a system bus or connector(s) that couple the components of network device 10 to one another, power management components, thermal management components, etc.

In the example of FIG. 1, processing circuitry 14 may execute a BGP process (sometimes referred to herein as a BGP agent) such as active BGP process 16 to exchange network routing information and network device capabilities with other network devices (sometimes referred to herein as peer network devices or BGP peer network devices). Accordingly, network device 10 may be a BGP peer network device or BGP speaker to its BGP peer network devices. In particular, each BGP peer network device may be associated with an Autonomous System (AS) and may be used to advertise information indicative of the reachability of destinations through the AS. If desired, multiple BGP speakers or peer network devices may exist within each AS.

BGP may use TCP as its transport protocol. Accordingly, network device 10 may establish a TCP session with each peer network device and may exchange BGP messages over each of these TCP sessions with a corresponding BGP peer network device. The exchanged network routing information may be used to generate or otherwise inform (e.g., affect the generation of) the packet forwarding decision data and therefore the packet forwarding behavior of packet processor(s) 22, among other functions.

Network device 10 and the components therein, such as control circuitry 12, one or more processors of processing circuitry 14, and/or even software executing on the one or more processors, can experience unplanned downtime or failure events, which can disrupt the execution of active BGP process 16. Accordingly, a separate BGP process such as standby BGP process 18 may also execute on processing circuitry 14 in device 10 or elsewhere in networking system 8 such as at network device 10' (e.g., on processing circuitry of network device 10' executing on software instructions for standby BGP process 18 stored on memory circuitry of network device 10'). In illustrative configurations described herein as an example, network device 10' may have at least the same components and/or functionalities as described for network device 10 (e.g., be another instance of network device 10). If desired, network device 10' may omit some of the components or functionalities of network device 10, and/or may include additional components or functionalities than those described for network device 10.

In general, active BGP process 16 and standby BGP process 18 may be executed on the same processor or on any combination of different processors. As just a few examples, active and standby BGP processes 16 and 18 may be executed on the same processor of processing circuitry 14, can be executed on two different processors for processing circuitry 14 in the same network device 10, or can be executed on respective processors of two different network devices 10 and 10' (e.g., in configurations where network devices 10 and 10' are housed in the same housing and/or mounted to the same chassis to respectively implement active and standby control plane supervisors on the same modular network device system having removably coupled line card module(s) inter-coupled via a backplane). If desired, network devices 10 and 10' may be distant stand-alone devices (e.g., fixed-configuration network devices having their own respective housings). In other illustrative arrangements, the active BGP process may be executed on a processor on local equipment (e.g., on network device 10) and the standby BGP process may be executed on computing resources on remote server equipment in networking system 8 (e.g., communicatively coupled through the communications network to network device 10).

Figure 2:
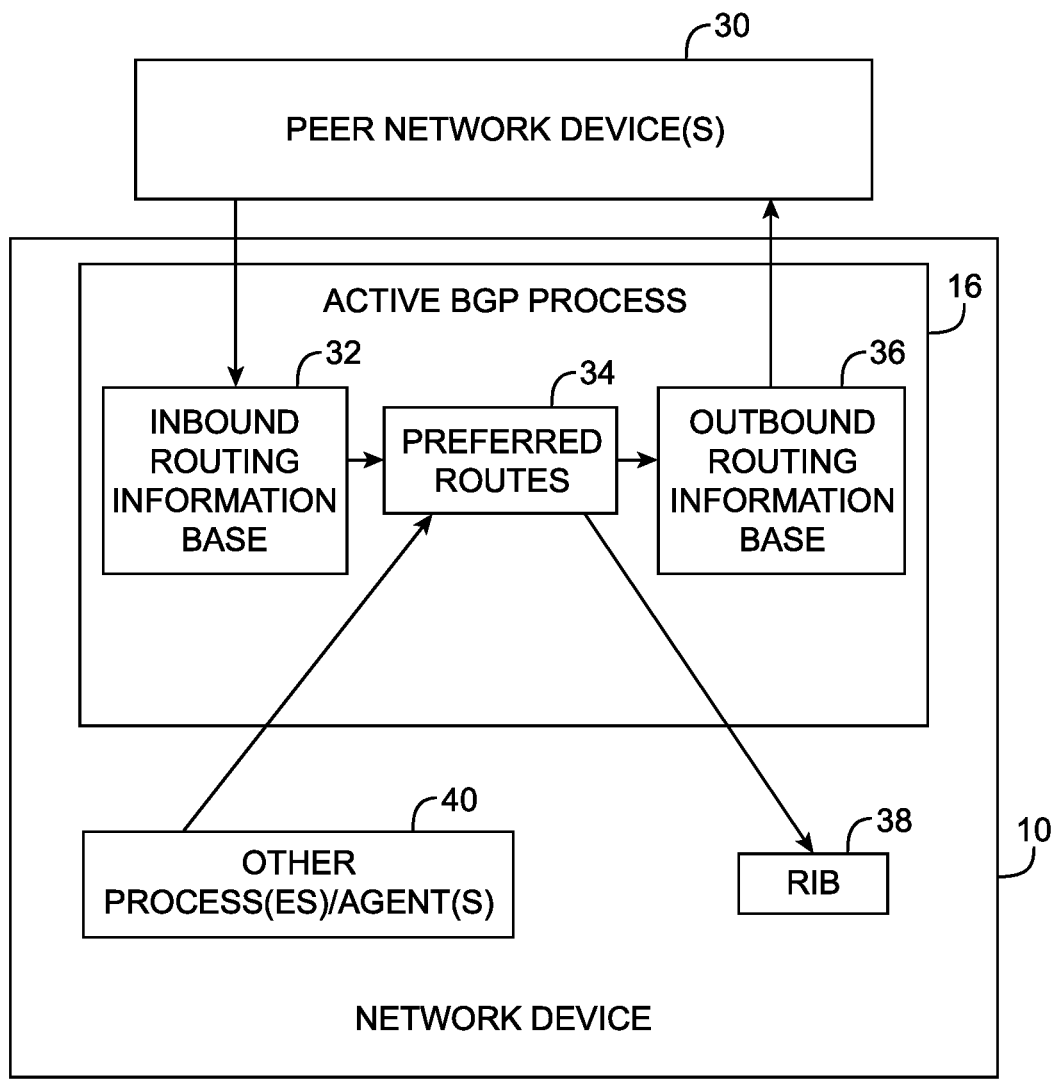
FIG. 2 is a diagram of an illustrative network device configured to communicate with one or more BGP peer network devices and to perform a BGP process in accordance with some embodiments.

FIG. 2 is a diagram of an illustrative BGP process such as active BGP process 16 executing on network device 10 (e.g., software instructions stored on memory circuitry 20 executed by processing circuitry 14 in FIG. 1). Active BGP process 16 may exchange network routing information (e.g., path attributes, network layer reachability information (NLRI), and withdrawn NLRI) with one or more peer network devices 30 on which respective BGP processes execute. A peer network device 30 and network device 10 running active BGP process 16 may communicate via BGP connections established over corresponding TCP sessions.

In particular, active BGP process 16 may receive routing information such as NLRIs, path attributes, and withdrawn NLRIs, from one or more peer network devices 30 over corresponding TCP session(s). The destinations (e.g., the set of IP (Internet Protocol) addresses defined by an IP prefix) specified by the NLRI and the path attributes associated with the destinations of the NLRI, collectively, are sometimes described herein as a route, whereas the path attributes themselves define a path for the route.

The received routing information may be stored at inbound routing information base (RIB) 32 (sometimes referred to as incoming routing information base 32 or adj-rib-in 32). Active BGP process 16 may maintain the incoming routing information (e.g., a collection of routes) at inbound RIB 32 by updating the collection of received routes as new BGP messages are received from peer network devices 30. Inbound RIB 32 may contain different versions of routes received from peer network devices 30. As examples, the routes stored at inbound RIB 32 may include raw or unmodified versions of routes received from peer network devices 30 and/or may include modified versions of routes received from peer network devices 30 (e.g., routes resulting from filtering and/or inbound policy being applied). Regardless of the version(s) of received routes stored at inbound RIB 32, (at least some of) these stored routes may await further processing via BGP route selection.

While inbound RIB 32 is illustrated in the example of FIG. 2 as a single structure, inbound RIB 32 may include multiple portions (e.g., may represent multiple smaller RIBs) organized in any suitable manner. As some illustrative examples of organization, each smaller RIB portion may be associated with a different peer network device 30 or a group of peer network devices 30, thereby containing routes advertised or announced by that peer network device 30 or by multiple peer network devices 30 in the same group. If desired, inbound RIB 32, through the smaller RIB portions therein, may be organized by BGP address family, by common inbound policy, or by any other desired common route or peer characteristic.

Active BGP process 16 may perform, among other operations, the (primary) operation of BGP route selection (e.g., a route or path select operation sometimes referred to as a best path algorithm or a best path selection operation) to generate or otherwise identify a collection of preferred routes 34 for different destinations sometimes referred to as (active) BGP routes. In particular, active BGP process 16 may perform route selection, for each set of destinations (e.g., IP prefixes defined by NLRI), based on path attributes and other path information advertised by peer network devices 30 stored at inbound RIB 32 and based on information not advertised by peer network devices 30 such as information indicative of routing policies (e.g., manually configured by a network administrator or user), information provided by other routing protocol processes or agents, etc. By processing the different information stored at inbound RIB 32 (e.g., different routes advertised by different peer network devices 30 to the same destinations) along with other inputs from other processes/agents 40 (e.g., routing policy information from policy agents, routing protocol information such as redistributed path information, path attribute information, next hop reachability information, etc., from other routing protocol agents), active BGP process 16 may select a set of preferred routes 34. Active BGP process 16 may maintain a local RIB (e.g., local to active BGP process 16) to store the set of selected preferred routes 34.

As an illustrative example of the route selection operation, active BGP process 16 may compare at least two routes to the same network destination (e.g., IP prefix defined by NLRI). These two routes to the same destination may be obtained from inbound RIB 32 (e.g., as part of a first advertised route from a first peer network device 30 and/or a second advertised route from a second peer network device 30) and/or from the local RIB (e.g., one or more preferred routes from a previously performed route selection). Active BGP process 16 may compare the different paths (e.g., their path attributes) to arrive at a new (preferred) path to the destination and therefore the new preferred route 34.

This comparison may be based on a comparison of different path attributes or parameters associated with the paths being compared. As examples, the compared path attributes or parameters, in order of comparison as performed by active BGP process 16, may be the local weight of each path (e.g., with higher weights preferred), the local preference for each path, whether a path originated locally via an aggregate or a network, the shortest AS_PATH (Autonomous System path), origin type of each path (e.g., Exterior Gateway Protocol (EGP) preferred over Interior Gateway Protocol (IGP)), multi exit discriminator (MED) for each path (e.g., with lower MED preferred), whether each path is external BGP or internal BGP (e.g., external BGP preferred over internal BGP), IGP metric of each path (e.g., with lower IGP metric to the BGP next hop preferred), order of paths received (e.g., first received path preferred), router ID of BGP peer network device from which each path is received (e.g., with lower router ID preferred), cluster list of each path (e.g., with lower length of cluster list preferred), and neighbor address of each path (e.g., with lower neighbor address preferred). The new preferred route resulting from one or more comparisons based on the one or more above-mentioned path attributes or parameters may then be stored at the local RIB as the best path for the destination.

If desired, prior to the comparison, active BGP process 16 may alter one or more path attributes of, filter out, and/or generally process the one or more routes to influence and change the result of the comparison (e.g., to arrive at or select a preferred route 34 resulting from the comparison that otherwise would not have been selected or preferred). In the example of FIG. 2, active BGP process 16 may receive information from one or more external sources such as other processes or agents 40 and may use this received information to alter, filter, and/or generally process the one or more routes for comparison prior to the comparison. In particular, other processes or agents 40 may include routing policy agent(s) (e.g., as part of routing policy management software, containing and managing policy information base(s), etc.) that implement routing policies or otherwise provide policy information to active BGP process 16, may include routing protocol agent(s) or other processes that provide next hop reachability information (e.g., indicating whether the next hops of routes are reachable), distributed paths and their attributes (e.g., from an IGP protocol agent), and/or generally other processes or agents 40 that provide inputs to the BGP decision process (e.g., BGP route selection). As an example, the policy information may alter path attributes (e.g., weight, local preference, etc.) of routes based on the route matching one or more criteria set by the policy. In general, the routing policies may be customized by and received as user (e.g., network administrator) input.

As desired, one or more stored preferred routes 34 at the local RIB may be installed or stored at the routing information base (RIB) 38 for network device 10. RIB 38 (sometimes referred to as main RIB 38 or network device RIB 38) may include routes based on which packet forwarding decision data is generated (e.g., for use by packet processor(s) 22 in FIG. 1). Depending on the configuration of network device 10, the BGP preferred route may not always be installed on RIB 38 (e.g., routes from other protocol agents such as IGP agents and/or static routes may instead be installed on RIB 38 for any particular destination or network IP prefix).

One or more stored preferred routes 34 at the local RIB may further be conveyed to and stored on outbound RIB 36 (sometimes referred to as outgoing RIB 36 or adj-rib-out 36) for advertisement to one or more peer network devices 30 as routing information (e.g., NLRIs and path attributes). Active BGP process 16 may maintain the outgoing routing information (e.g., a collection of routes) at outbound RIB 36 by storing not yet advertised routing information. Active BGP process 16 may convey the routing information for advertisement to each peer network device 30 over a corresponding TCP session with that peer network device 30. The set of peer network devices 30 from which advertised routing information is received may be the same or may be different from the set of peer network devices 30 to which advertised routing information is transmitted.

While outbound RIB 36 is illustrated in the example of FIG. 2 as a single structure, outbound RIB 36 may include multiple portions (e.g., may represent multiple smaller RIBs) organized in any suitable manner. As some illustrative examples of organization, each smaller RIB portion may be associated with a different peer network device 30 or a group of peer network devices 30, thereby containing routes to be advertised or announced to that peer network device 30 or to multiple peer network devices 30 in the same group. If desired, outbound RIB 36, through the smaller RIB portions therein, may be organized by BGP address family, by common outbound policy, or by any other desired common route or peer characteristic.

While inbound RIB 32, the local RIB storing preferred routes 34, outbound RIB 36, and main RIB 38 are sometimes referred to herein as separate data structures for storing separate routing information, if desired, the different RIBs may be implemented on a shared data storage structure and/or across any combination of data storage(s) (e.g., on memory circuitry 20 in FIG. 1). Configurations in which inbound RIB 32, the local RIB storing preferred routes 34, and outbound RIB 36 are stored on a shared data storage circuit on memory circuitry 20, while main RIB 38 is stored on a separate data storage circuit on memory circuitry 20 are sometimes described herein as an illustrative example.

Figure 3:
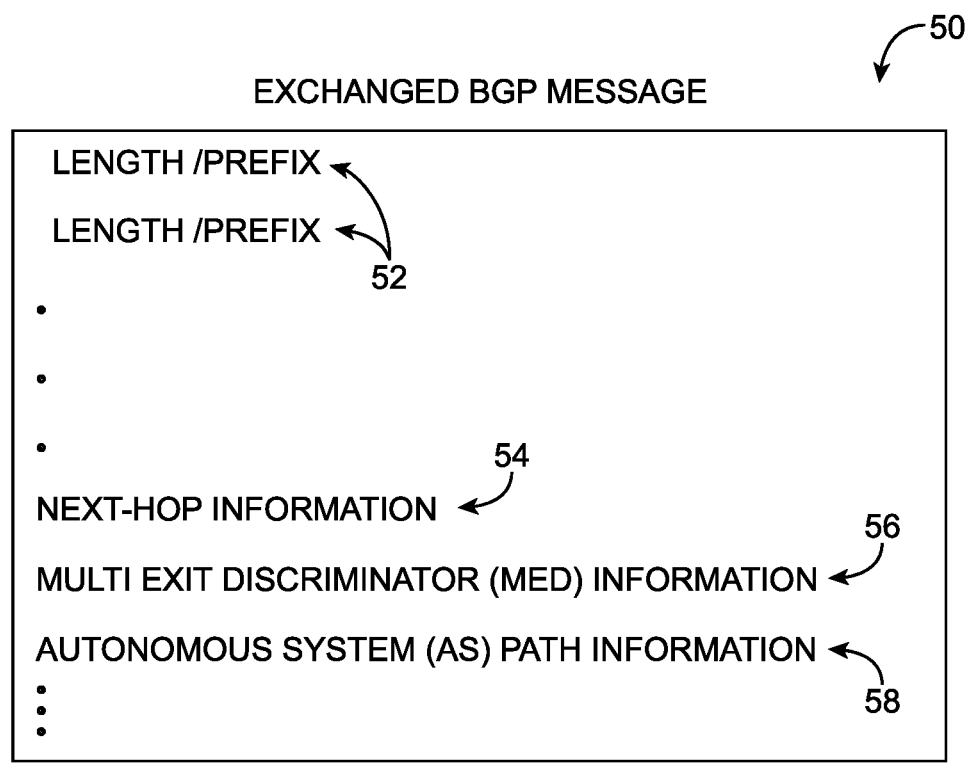
FIG. 3 is a diagram of an illustrative BGP message communicated between BGP peer network devices in accordance with some embodiments.

FIG. 3 is a diagram of an illustrative BGP message received by network device 10 from a peer network device 30 and/or sent to a peer network device 30 by network device 10 via transport layer protocol sessions such as TCP session(s) (e.g., encapsulation with TCP/IP headers). BGP messages such as BGP message 50 may generally be conveyed between peer BGP network devices when the BGP session is initiated, periodically as BGP update messages containing (newly) advertised (and/or withdrawn) routes, and/or at any other suitable time. In particular, BGP message 50 may include NLRI 52 that specifies one or more network destinations (e.g., IP addresses) defined using corresponding sets of a length and a network (e.g., IP) prefix (e.g., 2-tuples) that are reachable by the transmitting peer network device. In particular, the length may represent a network mask (e.g., in Classless Inter-Domain Routing notation such as /8, /16, /23, /24, /25, etc.) to apply to the prefix and the prefix may represent one or more network addresses for the subnet (e.g., an IP prefix containing trailing bits to an octet boundary that specifies network IP addresses for the subnet).

Additionally, BGP message 50 may include path attributes that define the path advertised in the BGP message. Each pair of a length and a network prefix (specified by NLRI 52) defines a set of destinations, which in combination with the corresponding path attributes for the path, may sometimes be referred to herein as a route for the set of destinations.

In the example of FIG. 3, the path attributes are shown to include next-hop information 54 (e.g., information indicative of the IP address of the border router that should be used as the next hop to the destination of the route(s) specified in NLRI 52), multi exit discriminator (MED) information 56 (e.g., used to discriminate between multiple exit points to a neighboring Autonomous System), Autonomous System path information 58 such as a set or sequence of AS path segments. However, other required and/or desired path attributes may also be present in BGP message 50. These path attributes may include origin information indicative of the origin of the routing information (e.g., an attribute generated by and indicative of the original BGP speaker from which the routing information originated), local preference information indicative of the degree of preference for an advertised route, an atomic aggregate attribute, an aggregator attribute, etc. While not explicitly illustrated in the example of FIG. 3, BGP update messages (e.g., BGP message 50) may also include information indicative of withdrawn routes (e.g., destinations or NLRIs that have become unreachable and are being withdrawn from service) and length indicators indicative of length of path attributes, NLRIs, etc. The order of information present in BGP message 50 in FIG. 3 is merely illustrative and may be different than shown in FIG. 3.

The example of FIG. 3 is merely illustrative. In general, BGP messages conveyed between peer devices may include any combination of update messages, route refresh messages, keepalive messages, notification messages, and other types of BGP/TCP messages or packets.

In one illustrative scenario described as an example, active BGP process 16 (FIG. 2) in receipt of BGP message 50 may first store the received NLRI 52 and path attributes advertised by a peer network device 30 in inbound RIB 32. During processing, active BGP process 16 may use one or more of the path attributes (e.g., information 54, 56, and 58 and/or other path attributes) for received NLRI 52 to compare with analogous path attributes for another route (e.g., in inbound RIB 32 or in the local RIB storing preferred routes 34) to perform its route selection operation. If preferred, the route (or multiple routes, if specified) advertised in BGP message 50 and stored at inbound RIB 32 may be installed as a preferred route (e.g., replacing the previously preferred route) for the NLRI-specified destinations on the local RIB of active BGP process 16. The route may optionally be installed in main RIB 38 of network device 10 and/or may optionally be installed in outbound RIB 36 for advertisement to other peer network devices 30 (FIG. 2).

A network device can experience unplanned downtime or failure events which disrupt the BGP process executing on the network device. While the network device can restart its BGP process, it can take a significant amount of time until the newly restarted BGP process is fully recovered (e.g., has obtained all necessary internal states such as the different routes on the different RIBs to continue normal BGP process operations as performed prior to the disruption). As an example, to be fully recovered, the BGP process may need to re-establish BGP sessions over transport layer protocol (e.g., TCP) sessions with its BGP peer network devices, receive the corresponding incoming routing formation (e.g., routes) through the re-established sessions for storage at the inbound RIB, compute preferred routes for storage at the local RIB, populate the outbound RIB with preferred routes for advertisement, and advertise the corresponding outgoing routing information (e.g., routes) through the re-established BGP sessions to its BGP peer network devices.

To reduce this recovery time following a failure event, a standby BGP process may be provided concurrently with the active BGP process. In order to facilitate a quick and seamless transition from the active BGP process to the standby BGP process in response to the failure event, the standby BGP process may be configured, among other functions, to continue (e.g., resume) transport layer protocol sessions originally established by the (now failed) active BGP process such that there is minimal disruption during BGP switchover.

Due to the nature of the failure event being unplanned, care must be taken in order to ensure that the standby BGP process properly continues the transport layer sessions left off by the failed active BGP process and does so quickly (e.g., to ensure the existing transport layer sessions do not expire and new transport layer sessions do not need to be established with peer devices).

Embodiments described below, and generally herein, sometimes use TCP as one example of a transport layer protocol for BGP. If desired, these embodiments may similarly be used with other transport layer protocols in scenarios where BGP peer sessions are established using these other transport layer protocols.

In accordance with some embodiments, it may be beneficial to operate the standby BGP process such that it can handle a switchover on short notice and without behaving disruptively in a way that is noticeable to peer BGP devices. A seamless switchover from an active BGP process to a standby BGP process may require conveyance of TCP state information (or other transport layer protocol state information in other configurations) from the active BGP process to the standby BGP process. In particular, the embodiments described herein relate to the conveyance and maintenance of transport layer protocol state information such as TCP state information.

Figure 4:
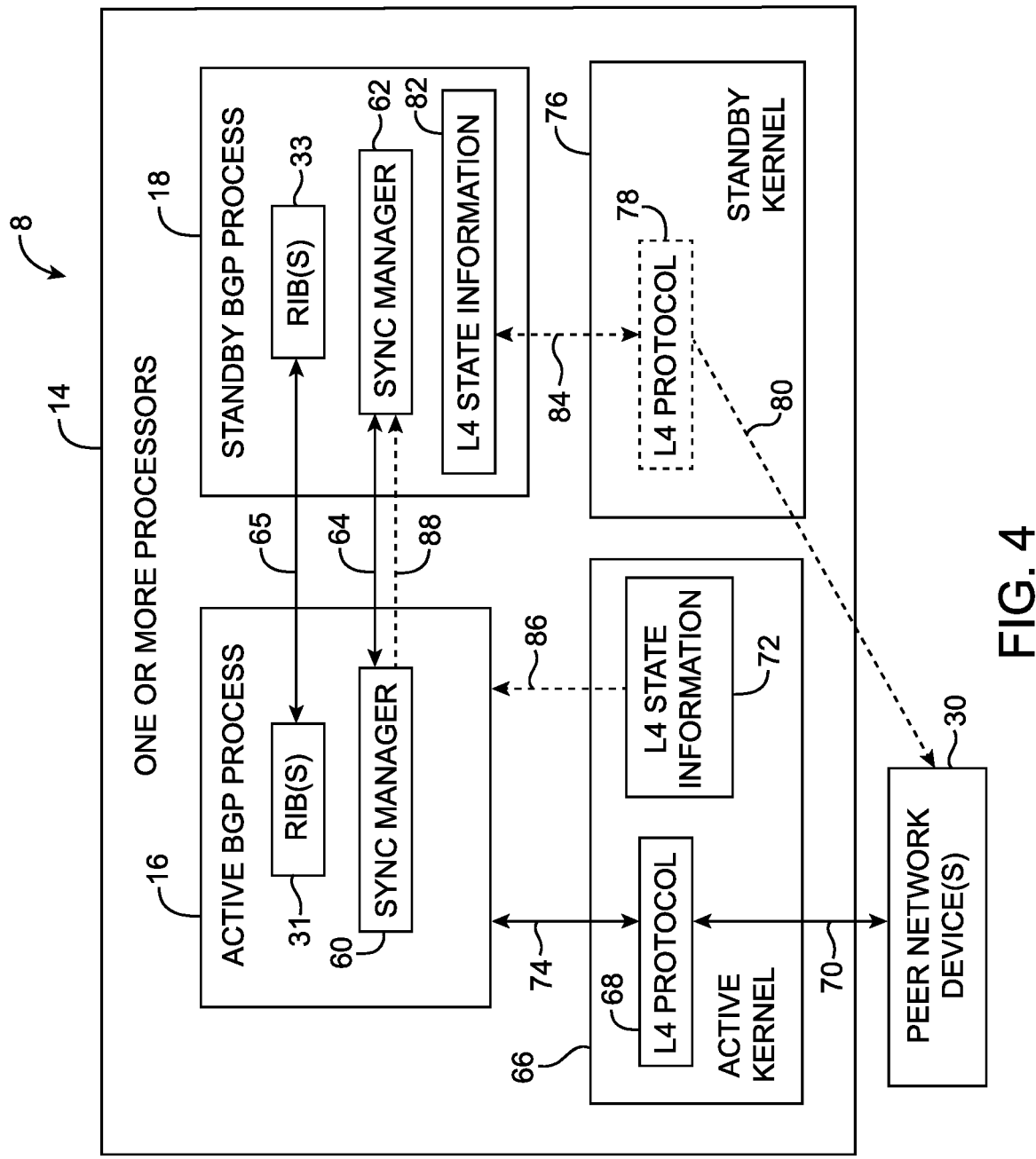
FIG. 4 is a diagram of an illustrative system containing an active BGP process configured to convey transport layer (L4) state information to a standby BGP process in accordance with some embodiments.

FIG. 4 is a diagram of an illustrative standby BGP process executing concurrently with an active BGP process. As shown in FIG. 4, one or more processors 14 in system 8 (e.g., any combination of processors on network device 10 and/or network device 10' as described in connection with FIG. 1) may execute active BGP process 16 (sometimes referred to as an active (primary) BGP agent) and standby BGP process 18 (sometimes referred to as a standby (secondary) BGP agent). Active BGP process 16 may maintain a number of RIBs 31 such as inbound RIB 32, a local RIB 34, and outbound RIB 36 in FIG. 2. Standby BGP process 18 may similarly maintain a number of RIBs 33 such as an inbound RIB, a local RIB, and an outbound RIB.

To enable management of the flow of BGP and/or TCP state information, active BGP process 16 may include a synchronization manager 60 and standby BGP process 18 may include a synchronization manager 62. Multiple threads can run on each BGP process (e.g., on active BGP process 16 and on standby BGP process 18). A corresponding thread on each BGP process may implement each corresponding synchronization manager 60 or 62. Other threads such as inbound and outbound threads on each BGP process may be used respectively to synchronize inbound and output information (e.g., convey information in inbound and outbound RIBs of active BGP process 16 to standby BGP process 18).

Synchronization manager 60 and 62 may generally coordinate BGP state synchronization, perform TCP state conveyance, perform TCP state maintenance operations, and/or perform other state synchronization management operations within active BGP process 16, within standby BGP process 18, between active BGP process 16 and standby BGP process 18, within networking system 8, etc. In particular, synchronization manager 60 and 62 may oversee synchronization staging and control synchronization logic in inbound and outbound threads using cross-thread channels within respective BGP processes.

To coordinate synchronization operations between active BGP process 16 and standby BGP process 18, synchronization manager 60 can communicate with synchronization manager 62 via a communication channel 64. One or more additional communication channels 65 may be used to convey (e.g., synchronize) routing information between active and standby BGP processes 16 (e.g., between inbound RIBs, between outbound RIBs, between local RIBs, etc.). As examples, inbound and outbound threads in active BGP process 16 may communicate inbound RIB routing information and output RIB routing information, respectively, with inbound and outbound threads in standby BGP process 18. In some configurations described herein as an illustrative example, each of communication channels 64 and 65 may be a TCP-based communication channel. However, the use of TCP-based channels in synchronizing state information and/or generally communicating between active BGP process 16 and standby BGP process 18 is merely illustrative. If desired, inter-agent channels based on other types of network communications protocols such as User Datagram Protocol (UDP), Transport Layer Security (TLS) protocol, Secure Sockets Layer (SSL) protocol, or other protocols can be employed.

One or more processors 14 (e.g., the same processor on which active BGP process 16 is executed) may also execute processes for a kernel such as active kernel 66. Kernel 66 may, among numerous other functions, execute one or more processes that implement communication protocols (e.g., transport layer protocols, network layer protocols, data link layer protocols, etc.), thereby implementing a communication protocol stack with which active BGP process 16 may communicate with peer network devices 30.

As shown in the example of FIG. 4, kernel 66 may provide a L4 protocol (e.g., TCP) stack 68 for active BGP process 16 to transmit BGP messages to and/or receive BGP messages from each of peer network devices 30. In other words, L4 protocol stack 68 may enable the establishment of a transport layer (e.g., TCP) session 70 with a corresponding peer network device 30. In a similar manner, additional transport layer sessions may be established with other peer network devices 30. Each transport layer session 70 may be associated with corresponding transport layer protocol state information 72 used to establish and maintain that transport layer session 70. L4 protocol stack 68 may access and update the appropriate transport layer protocol state information 72 to correctly transmit and receive BGP messages. A communication channel such as channel 74 connecting the kernel space and the user space may be used to convey BGP application data (e.g., BGP messages such as message 50 in FIG. 3) between active BGP process 16 (e.g., in the user space) and L4 protocol stack 68 (e.g., in the kernel space).

In order to preserve the transport layer sessions and therefore the BGP sessions to peer network devices 30 during BGP process switchover, standby BGP process 18 may be configured to maintain transport layer protocol state information 82 (e.g., TCP). More specifically, transport layer protocol state information 82 may be kept up-to-date such that standby BGP process 18 contains and/or can access all necessary transport layer protocol state information to preserve each transport layer session in response to an unplanned failure event at any given time after setup. In other words, in response to the unplanned failure event and for BGP switchover, one or more processors 14 may execute processes for another kernel such as standby kernel 76. The executed processes may implement a L4 protocol stack 78 (in combination with other protocol layers in the communication protocol stack). L4 protocol (e.g., TCP) stack 78 may set up corresponding transport layer sessions using transport layer protocol state information 82. After BGP switchover, transport layer (e.g., TCP) sessions 80 established between L4 protocol stack 78 and peer network devices 30 may serve as replacements or more specifically continuations of transport layer sessions between L4 protocol stack 68 and peer network devices 30. In such a manner, when standby BGP process 18 takes over as the new active BGP process, standby BGP process may, via communication channel 84, transmit BGP messages or other application data to and receive BGP messages or other application data from L4 protocol stack 78 implemented at the new active kernel space 76 (in place of the kernel space for kernel 66).

Active kernel 66 and standby kernel 76 may be Linux-based kernels, Unix-based kernels, WINDOWS®-based kernels, ANDROID®-based kernels, XNU-based kernels, or kernels based on other operating systems, as examples.

In illustrative configurations described herein as an example, transport layer protocol state information 72 at active kernel 66 and transport layer protocol state information 82 maintained at standby BGP process 18 may be TCP state information.

Figure 5:
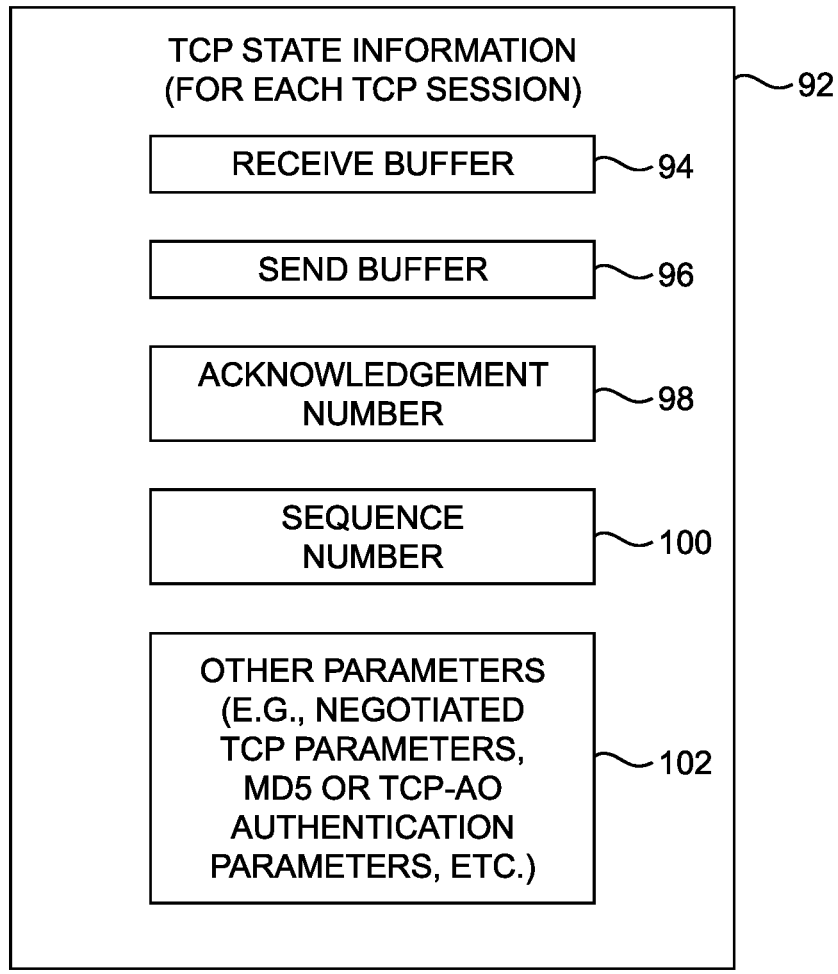
FIG. 5 is a diagram of illustrative TCP state information in accordance with some embodiments.

FIG. 5 shows illustrative types of TCP state information 92 (e.g., transport layer protocol state information 72 and transport layer protocol state information 82 in FIG. 4) that may be usable to preserve and properly continue each TCP session 70 using replacement TCP sessions 80. As shown in FIG. 5, TCP state information may be conveyed, maintained, and used on a per-TCP session basis (e.g., for each TCP session, a corresponding set of TCP state information may be conveyed, maintained, and used). In other words, each TCP session may be associated with a different set of TCP state information 92.

In the example of FIG. 5, TCP state information 92 may represent the types of information conveyed from active BGP process 16 to standby BGP process 18, maintained at standby BGP process 18, and used to set up TCP sessions 80 for standby BGP process 18 when desired (e.g., for BGP switchover). TCP state information 92 may include buffer content such as receive buffer content in TCP receive buffer 94 and send buffer content in TCP send buffer 96, may include TCP parameters such as TCP acknowledgement number 98 and TCP sequence number 100 and other parameters 102 such as negotiated TCP parameters (e.g., TCP window size, maximum segment size (MSS), etc.), TCP authentication parameters (e.g., parameters for MD-based authentication, parameters for TCP-AO (Authentication Option)), and/or any other desired parameters. In general, TCP state information 92 for each given TCP session may include all data or parameters needed to fully reconstruct the state of the TCP session in case of an unplanned failure event.

Referring back to FIG. 4, transport layer protocol state information 72 (e.g., content in receive buffer 94, content in send buffer 96, acknowledgement number 98, sequence number 100, etc., in FIG. 5) may be conveyed to standby BGP process 18 and maintained as transport layer protocol state information 82 in any suitable manner. In one illustrative configuration described herein as an example, L4 protocol state information 72 (stored at the kernel space) indicating a state of transport layer session 70 may be conveyed (e.g., by kernel 66) to active BGP process 16 (e.g., as indicated by path 86 over channel 74). Synchronization manager 60 of active BGP process 16 may convey the received L4 protocol state information 72 to synchronization manager 62 of standby BGP process 18. The conveyed L4 protocol state information 72 may be stored at standby BGP process 18 as L4 protocol state information 82. This version of L4 protocol state information may represent the initial state information received by standby BGP process 18.

To obtain the initial state of transport layer session 70 (e.g., L4 protocol state information) from active kernel 66, kernel 66 may, at a suitable time, temporarily block traffic over transport layer session 70 from reaching L4 protocol stack 68 such that a snapshot of L4 protocol state information 72 for L4 protocol stack 68 (e.g., at this given instance in time) can be conveyed to active BGP process 16 and subsequently forwarded to standby BGP process 18. This blocking of traffic may be implemented by a firewall rule implemented at kernel 66, as an example. The captured snapshot may include any L4 protocol (e.g., TCP) parameters such as kernel socket parameters for session 70, buffer content for session 70, source and destination addresses for session 70, source and destination port numbers for session 70, and/or other information as described in connection with FIG. 5.

After receiving the initial state of session 70 represented by the received L4 protocol state information 72, standby BGP process 18 may send a message confirming receipt of the snapshot information to active BGP process 16 and kernel 66. Upon receiving this confirmation message, kernel 66 may unblock the previously blocked traffic (e.g., by removing the firewall rule).

Standby BGP process may store the received initial state of session 70 as L4 protocol state information 82. Standby BGP process 18 may further internally maintain L4 protocol state information 82 to keep this copy of the state information for session 70 (e.g., the values and content therein) up-to-date. In other words, updated L4 protocol state information 82 will differ from the initially received set of L4 protocol state information and may reflect the most current state of session 70 (e.g., TCP parameters currently used for session 70, current content of buffers for session 70). Maintained in this manner, L4 protocol state information 82 may always contain sufficient and correct information such that standby BGP process 18 can set up its own L4 session(s) (e.g., TCP session 80) using maintained TCP state information 82 to continue the transmission and reception of BGP messages in place of session 70. Because L4 protocol state information 82 should be updated based on traffic conveyed through session 70, standby BGP process 18 may be configured to receive traffic such as BGP messages conveyed through session 70 established at active kernel 66 for active BGP process 16.

Traffic conveyed through session 70 may be conveyed (e.g., by active BGP process 16 and/or active kernel 66) to standby BGP process 18 in any suitable manner to update L4 protocol state information 82 (e.g., TCP parameters, TCP buffer content, newly negotiated parameters, etc.). In one illustrative configuration described herein as an example, traffic (e.g., containing BGP messages or other data) received through and to be conveyed through session 70 may first be hairpinned through standby BGP process 18 prior to reaching its final destination.

Figure 6:
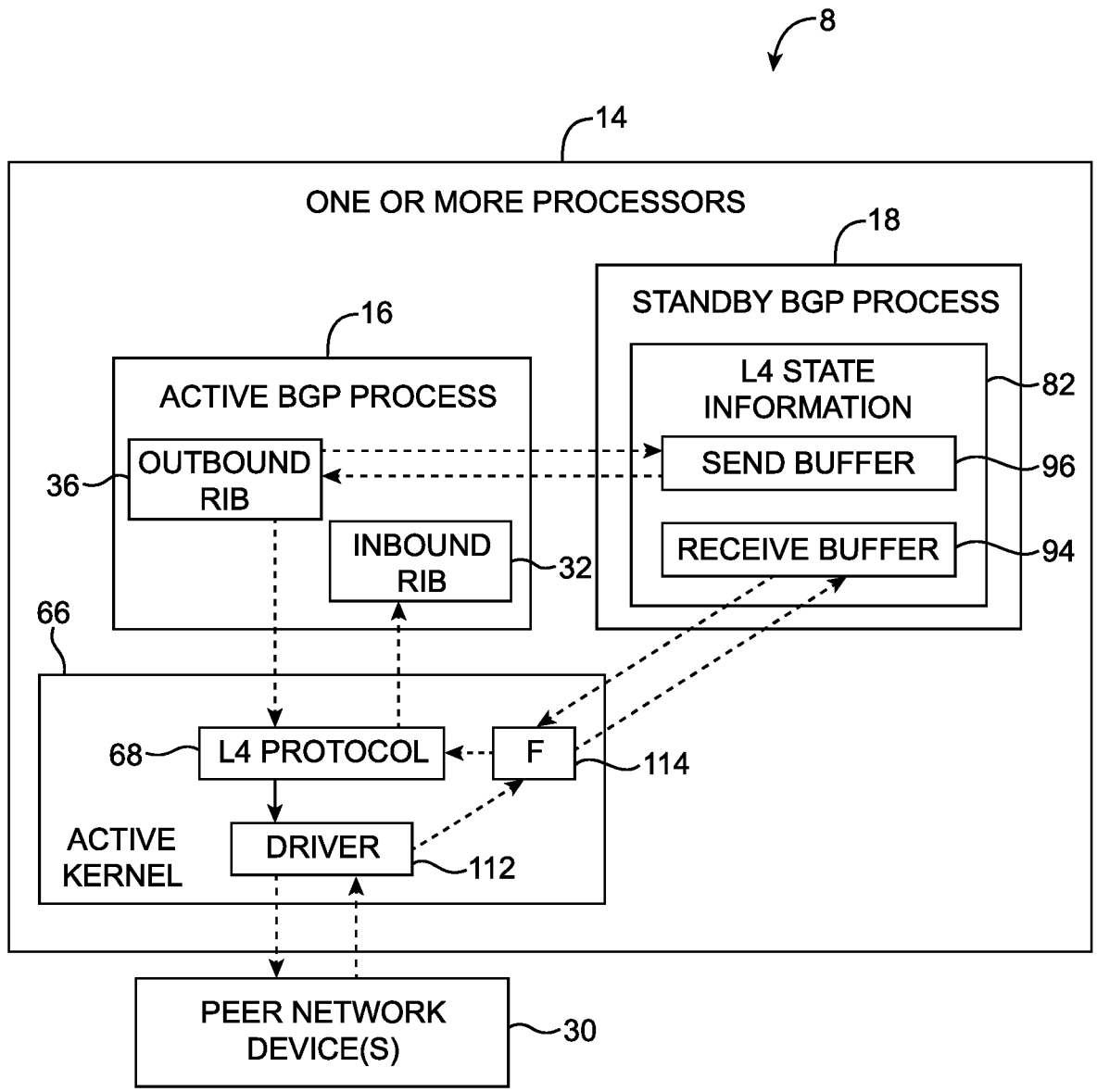
FIG. 6 is a diagram of an illustrative system containing a standby BGP process configured to update L4 state information in accordance with some embodiments.

FIG. 6 is a diagram of illustrative BGP message traffic conveyed across one or more L4 protocol sessions between active BGP process 16 and peer network devices 30 being forwarded to standby BGP process 18. Maintained L4 protocol state information 82 (e.g., content in send buffer 96, content in receive buffer 94, TCP sequence number 98, TCP acknowledgement number 199, etc.) maintained at standby BGP process 18 may be updated based on the BGP message traffic forwarded to standby BGP process 18.

As a first example of sharing BGP message traffic, BGP messages advertised by peer network devices 30 may be conveyed to driver 112 in active kernel 66. These received messages may be passed from driver 112 to a filter component such as filter component 114 (instead of directly to L4 protocol stack 68). Filter component 114 (e.g., implemented by a forwarding rule at kernel 66 matching on the desired BGP traffic) may pass the received BGP messages to standby BGP process 18 before ultimately passing the original received BGP messages to L4 protocol stack 68. This process of routing traffic between active BGP process 16 and peer BGP devices 30 through intervening standby BGP process 18 may sometimes be referred to herein as hairpinning.

In particular, as peer-advertised ingress BGP message traffic (or generally TCP traffic through the corresponding TCP sessions) is received by standby BGP process 18, standby BGP process 18 may update L4 protocol state information 82. As examples, standby BGP process 18 may insert newly received content into receive buffer 94 maintained at standby BGP process 18, may clear or remove acknowledged content from send buffer 96 from standby BGP process 18 (e.g., based on acknowledgement numbers in the received messages in the ingress or inbound direction from peer device 30 to active BGP process 16), and/or may update other L4 protocol parameters (e.g., acknowledgement number 98, sequence number 100, etc.). Standby BGP process 18 may process or consume content in receive buffer 94 sequentially to maintain the inbound RIB of standby BGP process 18 and/or perform other types of BGP processing (e.g., apply inbound policy, perform BGP best path computation, etc.).

By forwarding this ingress BGP message traffic first to standby BGP process 18, standby BGP process 18 may process the BGP message traffic to update L4 protocol state information 82 and pass the forwarded BGP message traffic back to filter component 114 and subsequently L4 protocol stack 68. L4 protocol stack 68 may subsequently provide the peer-advertised and hairpinned BGP message traffic to active BGP process 16 for inbound BGP processing. Communication between L4 protocol stack 68 and active BGP process 16 may occur using channel 74 in FIG. 4.

As a second example of sharing BGP message traffic, BGP messages to be advertised by network device 10 (e.g., the network device on which active BGP process 16 is executed) may be conveyed from outbound RIB 36 of active BGP process 16 to standby BGP process 18 prior to being sent out for advertisement. These egress BGP messages to be advertised may be conveyed to standby BGP process 18 via any suitable communication channel (e.g., communication channel 65 in FIG. 4). As standby BGP process 18 receives the egress BGP messages from outbound RIB 36, standby BGP process 18 may update L4 protocol state information 82 based on the received BGP messages to be advertised by active BGP process 16. As examples, standby BGP process 18 may insert new content to be sent into send buffer 96 and/or may update other L4 protocol parameters (e.g., acknowledgement number 98, sequence number 100, etc.).

After being shared with standby BGP process 18, the egress BGP message traffic to be advertised may be conveyed from standby BGP process 18 back to active BGP process 16 and may subsequently be advertised. In particular, the egress BGP message traffic may be conveyed to active kernel 66 and, through corresponding TCP sessions established by communications protocol stack (e.g., TCP stack 68, driver 112, etc.) at kernel 66, to peer network devices 30.

In the example of FIG. 6, while active kernel 66 helps facilitate the hairpinning (e.g., forwarding) of ingress and egress BGP message traffic to and from active BGP process 16, active BGP process 16 still performs the inbound BGP processing (e.g., populating inbound RIB 32) and outbound BGP processing (e.g., populating outbound RIB 36), and other BGP functions as described in connection with FIG. 2.

Figure 7:
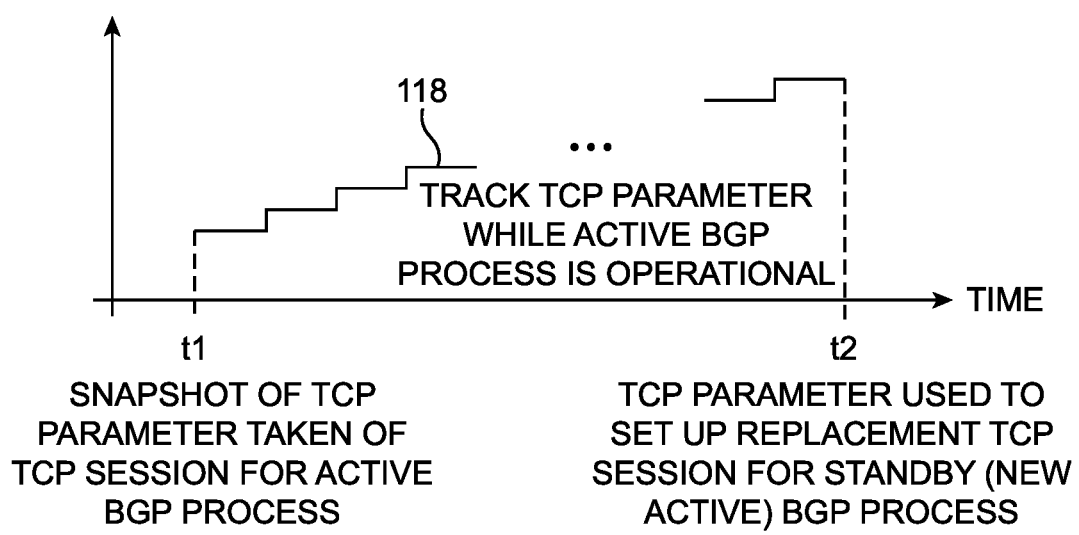
FIG. 7 is a graph of an illustrative TCP parameter being maintained over time in accordance with some embodiments.

FIG. 7 is a timing diagram of an illustrative TCP parameter such as TCP sequence number or TCP acknowledgement number being maintained (e.g., updated) over time by standby BGP process 18 based on hairpinned TCP traffic (e.g., containing ingress and/or egress BGP messages as described in example of FIG. 6). As shown in FIG. 7, tracking of the TCP parameter may begin at time t1. At time t1, a first (initial) value of the TCP parameter may be conveyed to standby BGP process 18. In particular, this first value of the TCP parameter may be obtained as part of the snapshot of the TCP parameters of the TCP session for active BGP process 16.

The initial value of the TCP parameter may be updated over time (e.g., between time t1 and t2). This type of updating may help track the actual value of the TCP parameter being used by active BGP process 16 while it is operational. Because actual TCP traffic (e.g., ingress and egress BGP message traffic) is shared with standby BGP process 18, the updating of the TCP parameter value may accurately reflect the current state of the active TCP session used by active BGP process 16.

In the example of FIG. 7, as reflected by function 118, the value of the TCP parameter may be updated in a step-wise manner (e.g., as hairpinned TCP traffic for the TCP session is periodically received by standby BGP process 18). However, this is merely illustrative. In other scenarios, the updating of the value of the TCP parameter may exhibit other functions or characteristics as dictated by the flow of TCP traffic.

At time t2, in response to an unplanned failure event (e.g., at active BGP process 16 and/or at kernel 66), a second (up-to-date) value of the TCP parameter may be used to set up a corresponding TCP session for standby BGP process 18 (e.g., the new active BGP process after BGP switchover).

Figure 8:
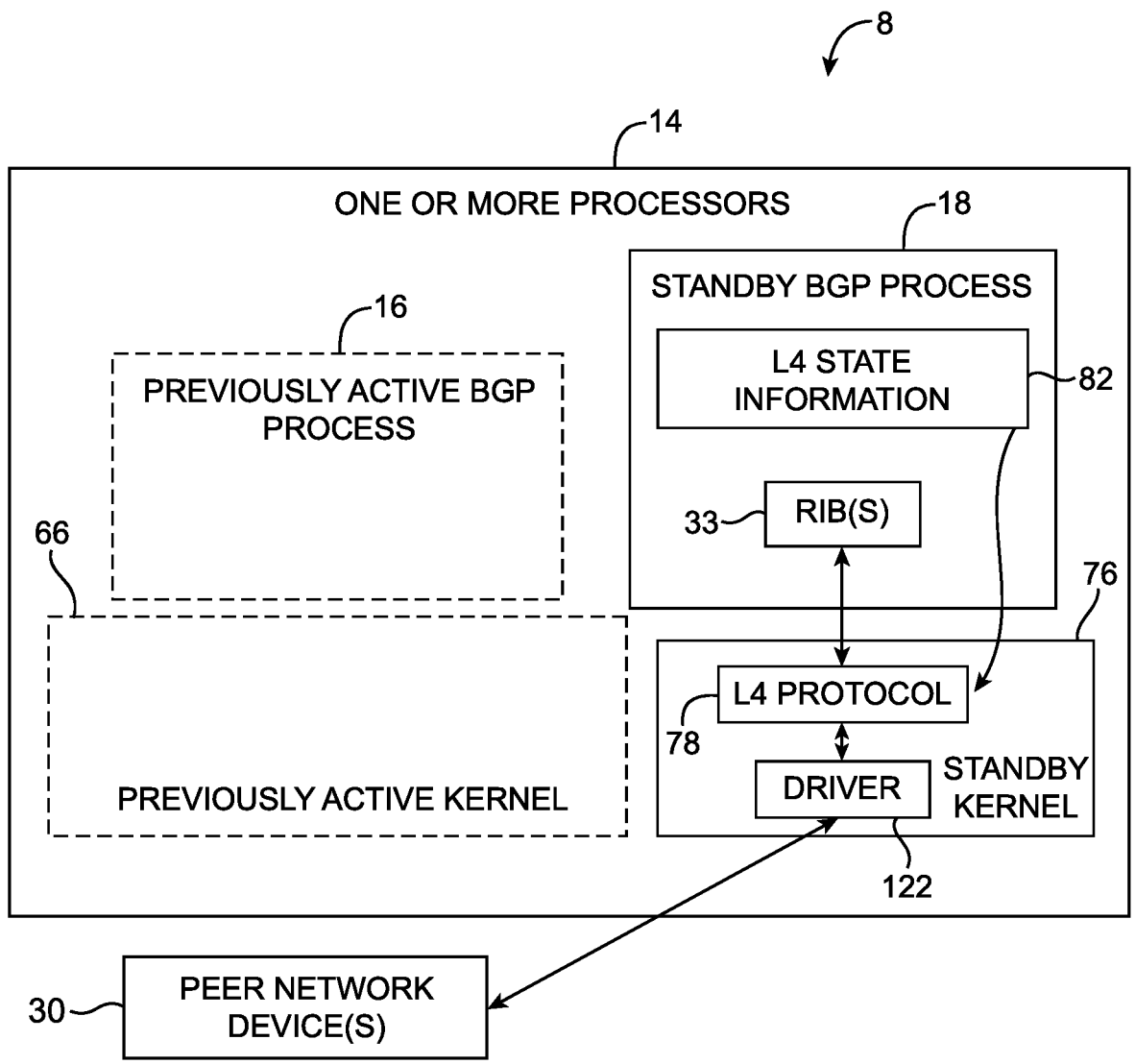
FIG. 8 is a diagram of an illustrative system containing a standby BGP process being promoted to operate as a new active BGP process in accordance with some embodiments.

FIG. 8 is a diagram of an illustrative standby BGP process 18 being promoted to the new active BGP process and setting up a corresponding L4 protocol stack using maintained L4 protocol state information 82. L4 protocol state information 82 (e.g., at the time of BGP switchover such as at time t2 in FIG. 7) may include any possible (BGP) application data for which re-transmission may be required (e.g., content in send buffer 96), content in receive buffer 94, the maintained sequence number to continue the previously active L4 session (e.g., the next TCP message may contain the maintained sequence number), the maintained acknowledgement number (e.g., tracking any missing BGP or application data needing peer retransmission), source and destination addresses and source and destination port numbers of the previously active L4 session, and/or any other information to set up the replacement L4 session or otherwise make this transition of transport layer sockets transparent to peer network devices 30.

In one illustrative configuration described herein as an example, upon detecting that previously active BGP process 16 (and/or kernel 66) is experiencing an unplanned failure event, standby kernel 76 may temporarily set up a firewall rule to block any traffic of the TCP sessions for previously active BGP process 16. At this time, standby kernel 76 for standby BGP process 18 may create a TCP socket and place the TCP socket in repair mode for configuration. L4 protocol state information 82 maintained at standby BGP process 18 may be conveyed to standby kernel 76. Kernel 76 may configure the TCP socket by setting the source and destination (e.g., IP) addresses and source and destination (L4) ports, by setting the TCP sequence number maintained at standby BGP process 18, the TCP acknowledgement number as maintained at standby BGP process 18, and by setting other TCP parameters such as negotiated TCP parameters (e.g., negotiated TCP window size, MSS, etc.), authentication parameters (e.g., TCP MD5 or TCP-AO key information), etc. In general, L4 protocol state information 82 may be moved to standby kernel 76 to create and set up the TCP socket.

Additionally, to ensure that in-flight TCP messages, messages intended for retransmission, and/or other pending messages are not missed, standby kernel 76 may obtain these pending messages from L4 protocol state information 82, which contains these messages as maintained in receive buffer 94 and send buffer 96.

After standby kernel 76 has fully reconstructed the TCP socket or generally a socket based on another L4 protocol using the maintained L4 protocol state information 82, standby kernel 76 may remove the firewall rule and continue normal communication protocol operations with L4 protocol stack 78 and driver 122. In other words, L4 protocol stack 78 may help standby BGP process 18 receive advertised BGP messages at RIBs 33 (e.g., inbound RIB(s)) from peer BGP devices 30 and may help standby BGP process 18 convey BGP messages from RIBs 33 (e.g., outbound RIB(s)) for advertisement to peer BGP devices 30.

Because the L4 socket(s) are set up with L4 session parameters maintained at standby BGP process 18 (e.g., L4 session parameters that active kernel 66 for active BGP process 16 would have used), L4 protocol stack 78 at standby kernel 76 may establish L4 sessions that serve as continuations of the L4 sessions originally handled by previously active kernel 66 for previously active BGP process 16. In such a manner, the switching of L4 sockets from those at previously active kernel 66 to those at standby kernel 76 can be made transparent to peer network devices 30.

Figure 9:
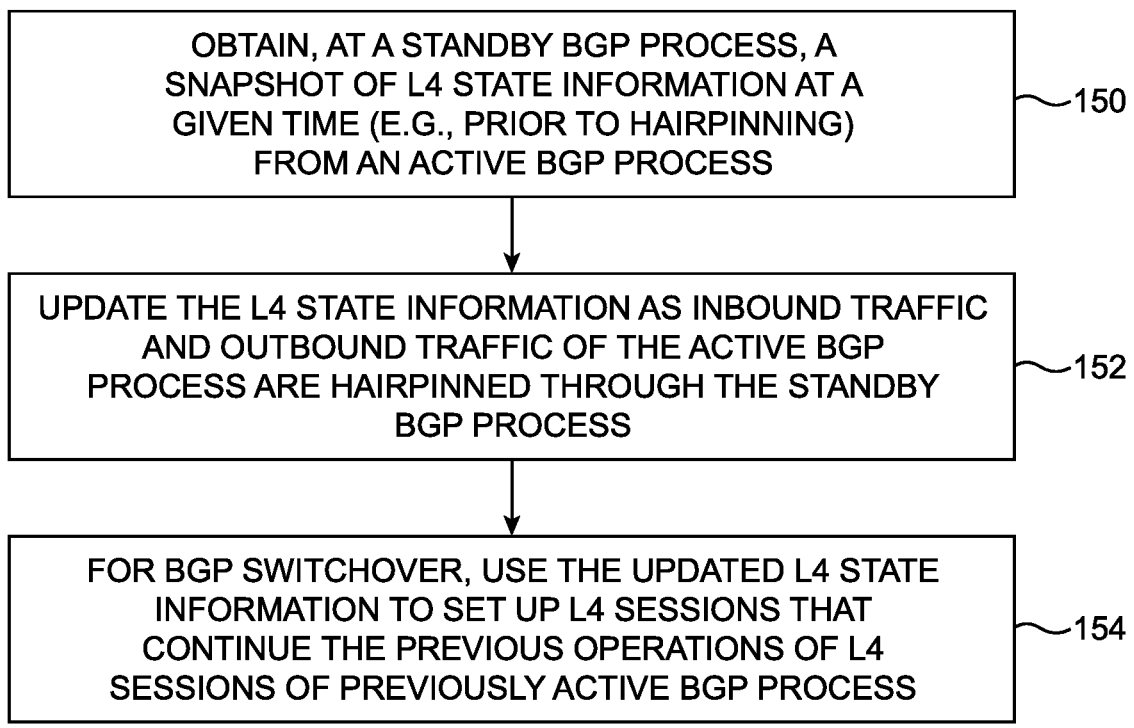
FIG. 9 is a flowchart of illustrative operations for handling L4 state information for a BGP switchover operation in accordance with some illustrative embodiments.

FIG. 9 is a flowchart of illustrative operations to handle continuity of L4 sessions in preparation for and during BGP switchover. The illustrative operations described in connection with active BGP process 16, standby BGP process 18, active kernel 66, and standby kernel 76 in FIG. 9 may generally be performed using processing circuitry (e.g., by executing software instructions stored on corresponding memory circuitry) such as processing circuitry 14 in network device 10, processing circuitry in network device 10', and/or processing circuitry on other computing equipment in system 8 (FIG. 1) dependent upon the configuration of active BGP process 16 and standby BGP process 18.

Operations performed at blocks 150 and 152 may be performed at a time period prior to and in preparation for BGP (process) switchover, while operations performed at block 154 may be performed at, during, or generally for BGP switchover (e.g., upon initiation of BGP switchover and/or in response to detection of a failure event that disrupts operation of active BGP process 16 or kernel 66).

At block 150, standby BGP process 18 may obtain a snapshot of L4 protocol (e.g., TCP) state information (e.g., information 72 in FIG. 4) at a given time (e.g., at time t1 in FIG. 7) from active kernel 66 via active BGP process 16. The given time may be prior to the occurrence of hairpinning L4 protocol session traffic (e.g., BGP message traffic) via standby BGP process 18 as described in connection with FIGS. 6 and 7.

At block 152, standby BGP process 18 may update the L4 protocol state information as ingress L4 protocol session traffic containing inbound BGP messages of active BGP process 16 and egress L4 protocol session traffic containing outbound BGP messages of active BGP process 16 are hairpinned through standby BGP process 18.

At block 154, for BGP switchover (e.g., as part of BGP switchover), standby kernel 76 for standby BGP process 18 may use the updated (e.g., up-to-date, or last-updated) L4 protocol state information to set up the corresponding L4 protocol sessions that continue the previous operations of L4 protocol sessions implemented at previously active kernel 66 for previously active BGP process 16.

The methods and operations described above in connection with FIGS. 1-9 may be performed by the components of one or more network devices or other computing equipment using software, firmware, and/or hardware (e.g., dedicated circuitry or hardware). Software code for performing these operations may be stored on non-transitory computer readable storage media (e.g., tangible computer readable storage media) stored on one or more of the components on one or more network devices or other computing equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of one or more network devices or other computing equipment (e.g., processing circuitry such as processing circuitry 14 on network device 10 of FIG. 1, processing circuitry on network device 10' of FIG. 1, or generally processing circuitry within networking system 8 of FIG. 1).

The foregoing is merely illustrative and various modifications can be made to the described embodiments. The foregoing embodiments may be implemented individually or in any combination.

What is claimed is:

1. A method for a border gateway protocol (BGP) switchover from an active BGP process to a standby BGP process, the method comprising:
   obtaining, by the standby BGP process, transport layer protocol state information, for a given time, of a transport layer session between the active BGP process and a peer BGP device;
   updating, by the standby BGP process, the transport layer protocol state information based on BGP messages conveyed, after the given time, over the transport layer session and forwarded to the standby BGP process; and
   based on a BGP switchover criterion being met, setting up a replacement transport layer session using the updated transport layer protocol state information, wherein the replacement transport layer session continues the transport layer session after the BGP switchover and wherein the transport layer protocol state information is updated prior to the BGP switchover criterion being met.

2. The method defined in claim 1, wherein obtaining the transport layer protocol state information of the transport layer session comprises:
   taking a snapshot of transport layer protocol parameters and transport layer protocol buffer content at the given time; and
   obtaining the transport layer protocol state information which contains the transport layer protocol parameters and the transport layer protocol buffer content.

3. The method defined in claim 2, wherein obtaining the transport layer protocol state information of the transport layer session comprises:
   prior to taking the snapshot, blocking, at a kernel for the active BGP process, traffic associated with the transport layer session from reaching a transport layer protocol stack for implementing the transport layer session; and
   after obtaining, by the standby BGP process, the transport layer protocol state information, unblocking, at the kernel for the active BGP process, traffic associated with the transport layer session.

4. The method defined in claim 2, wherein updating the transport layer protocol state information based on the BGP messages comprises:
   receiving, by the standby BGP process, egress traffic over the transport layer session from the active BGP process to the peer BGP device; and
   inserting, by the standby BGP process, the received egress traffic as send buffer content in a send buffer associated with the transport layer session and maintained at the standby BGP process.

5. The method defined in claim 4, wherein updating the transport layer protocol state information based on the BGP messages comprises:
   receiving, by the standby BGP process, ingress traffic over the transport layer session from the peer BGP device to the active BGP process; and
   inserting, by the standby BGP process, the received ingress traffic as receive buffer content in a receive buffer associated with the transport layer session and maintained at the standby BGP process.

6. The method defined in claim 5 further comprising:
processing, by the standby BGP process, the receive buffer content in the receive buffer for an inbound routing information base (RIB) at the standby BGP process.

7. The method defined in claim 5, wherein the ingress traffic comprises acknowledgement messages containing acknowledgement numbers and wherein updating the transport layer protocol state information based on the BGP messages comprises:
removing, by the standby BGP process, at least some of the send buffer content from the send buffer based on at least some of the acknowledgement messages.

8. The method defined in claim 3, wherein blocking traffic associated with the transport layer session from reaching the transport layer protocol stack comprises implementing a firewall rule and wherein unblocking traffic associated with the transport layer session comprises removing the firewall rule.

9. The method defined in claim 1, wherein the updated transport layer protocol state information comprises a sequence number, an acknowledgement number, and send buffer content in a send buffer and wherein setting up the replacement transport layer session using the updated transport layer protocol state information comprises:
creating, by a kernel for the standby BGP process, a transport layer socket;
placing, by the kernel for the standby BGP process, the transport layer socket in a repair mode; and
setting, by the kernel for the standby BGP process, the sequence number, the acknowledgement number, and the send buffer content for the transport layer socket.

10. The method defined in claim 9, wherein setting up the replacement transport layer session using the updated transport layer protocol state information comprises:
prior to creating the transport layer socket, blocking, at the kernel for the standby BGP process, traffic associated with the replacement transport layer session from reaching a transport layer protocol stack for implementing the replacement transport layer session; and
after setting the sequence number, the acknowledgement number, and the send buffer content for the transport layer socket, unblocking, at the kernel for the standby BGP process, traffic associated with the replacement transport layer session.

11. The method defined in claim 10, wherein blocking traffic associated with the replacement transport layer session from reaching the transport layer protocol stack comprises implementing a firewall rule and wherein unblocking traffic associated with the replacement transport layer session comprises removing the firewall rule.

12. The method defined in claim 1, wherein the BGP switchover criterion comprises detection of an unplanned failure event at the active BGP process.

13. The method defined in claim 1, wherein the transport layer session comprises a transmission control protocol (TCP) session and wherein the transport layer protocol state information comprises TCP parameters.

14. Non-transitory computer-readable storage media comprising computer-executable instructions that, when executed by one or more processors for a networking system, cause the one or more processors to:
execute a standby border gateway protocol (BGP) process in preparation for performing a BGP switchover in response to a failure event at an active BGP process, wherein the active BGP process communicates with a peer BGP device over a transmission control protocol (TCP) session prior to the failure event;
receive, by the standby BGP process, a snapshot of TCP parameters for the TCP session;
store, by the standby BGP process, the TCP parameters;
update, by the standby BGP process, the TCP parameters over a time period prior to the BGP switchover based on traffic conveyed over the TCP session and forwarded to the standby BGP process, wherein the updated TCP parameters have up-to-date values at an end of the time period that represent parameters of the TCP session for the active BGP process at the end of the time period; and
set up a replacement TCP session based on the up-to-date values of the updated TCP parameters as part of the BGP switchover.

15. The non-transitory computer-readable storage media defined in claim 14, wherein the TCP parameters comprise a TCP sequence number, a TCP acknowledgement number, and one or more negotiated TCP parameters.

16. The non-transitory computer-readable storage media defined in claim 15 further comprising computer-executable instructions that, when executed by the one or more processors for the networking system, cause the one or more processors to:
receive, by the standby BGP process, a snapshot of TCP buffer content for the TCP session;
store, by the standby BGP process, the TCP buffer content; and
update, by the standby BGP process, the TCP buffer content over the time period prior to the BGP switchover based on the traffic conveyed over the TCP session and forwarded to the standby BGP process, wherein the updated TCP buffer content has up-to-date content at the end of the time period that represents buffer content of the TCP session for the active BGP process at the end of the time period.

17. The non-transitory computer-readable storage media defined in claim 16, wherein the TCP buffer content comprises content in a TCP send buffer and content in a TCP receive buffer.

18. The non-transitory computer-readable storage media defined in claim 15, wherein the one or more negotiated TCP parameters comprise a TCP window size and wherein the TCP parameters comprise TCP authentication information.

19. A method for a border gateway protocol (BGP) switchover from an active BGP process to a standby BGP process, the method comprising:
obtaining, by the standby BGP process, transmission control protocol (TCP) state information of a TCP session for the active BGP process at a given time, the obtained TCP state information containing content in a send buffer at the given time;
storing, at the standby BGP process, the content in the send buffer;
updating, by the standby BGP process and prior to the BGP switchover, the content in the send buffer based on traffic conveyed, after the given time, over the TCP session for the active BGP process and forwarded to the standby BGP process;
based on a BGP switchover criterion being met, setting up a replacement TCP session for the standby BGP process to continue the TCP session for the active BGP process after the BGP switchover; and after the BGP switchover, performing a TCP retransmission, based on the updated content in the send buffer, for a message sent by the active BGP process prior to the BGP switchover.

20. The method defined in claim 19, wherein updating the content in the send buffer based on the traffic conveyed over the TCP session for the active BGP process and forwarded to the standby BGP process comprises:

receiving, by the standby BGP process, egress traffic over the TCP session from the active BGP process to a peer BGP device;

inserting, by the standby BGP process, the received egress traffic as new content in the send buffer;

receiving, by the standby BGP process, ingress traffic over the TCP session from the peer BGP device to the active BGP process, wherein the ingress traffic comprises acknowledgement messages containing TCP acknowledgement numbers; and removing, by the standby BGP process, at least some of the content from the send buffer based on at least some of the acknowledgement messages.

* * * * *